May 9, 1939.  J. W. R. HITESHEW  2,157,985
GLASSWARE FOOT MAKING MACHINE
Filed Nov. 13, 1936  4 Sheets-Sheet 1

James W. R. Hiteshew
INVENTOR

BY *Victor J. Evans & Co.*
ATTORNEYS

May 9, 1939.  J. W. R. HITESHEW  2,157,985
GLASSWARE FOOT MAKING MACHINE
Filed Nov. 13, 1936  4 Sheets-Sheet 2

James W. R. Hiteshew.
INVENTOR
BY Victor J. Evans & Co.
ATTORNEYS

May 9, 1939.  J. W. R. HITESHEW  2,157,985

GLASSWARE FOOT MAKING MACHINE

Filed Nov. 13, 1936  4 Sheets-Sheet 3

James W. R. Hiteshew
INVENTOR

BY *Victor J. Evans & Co.*
ATTORNEYS

May 9, 1939.  J. W. R. HITESHEW  2,157,985
GLASSWARE FOOT MAKING MACHINE
Filed Nov. 13, 1936  4 Sheets-Sheet 4
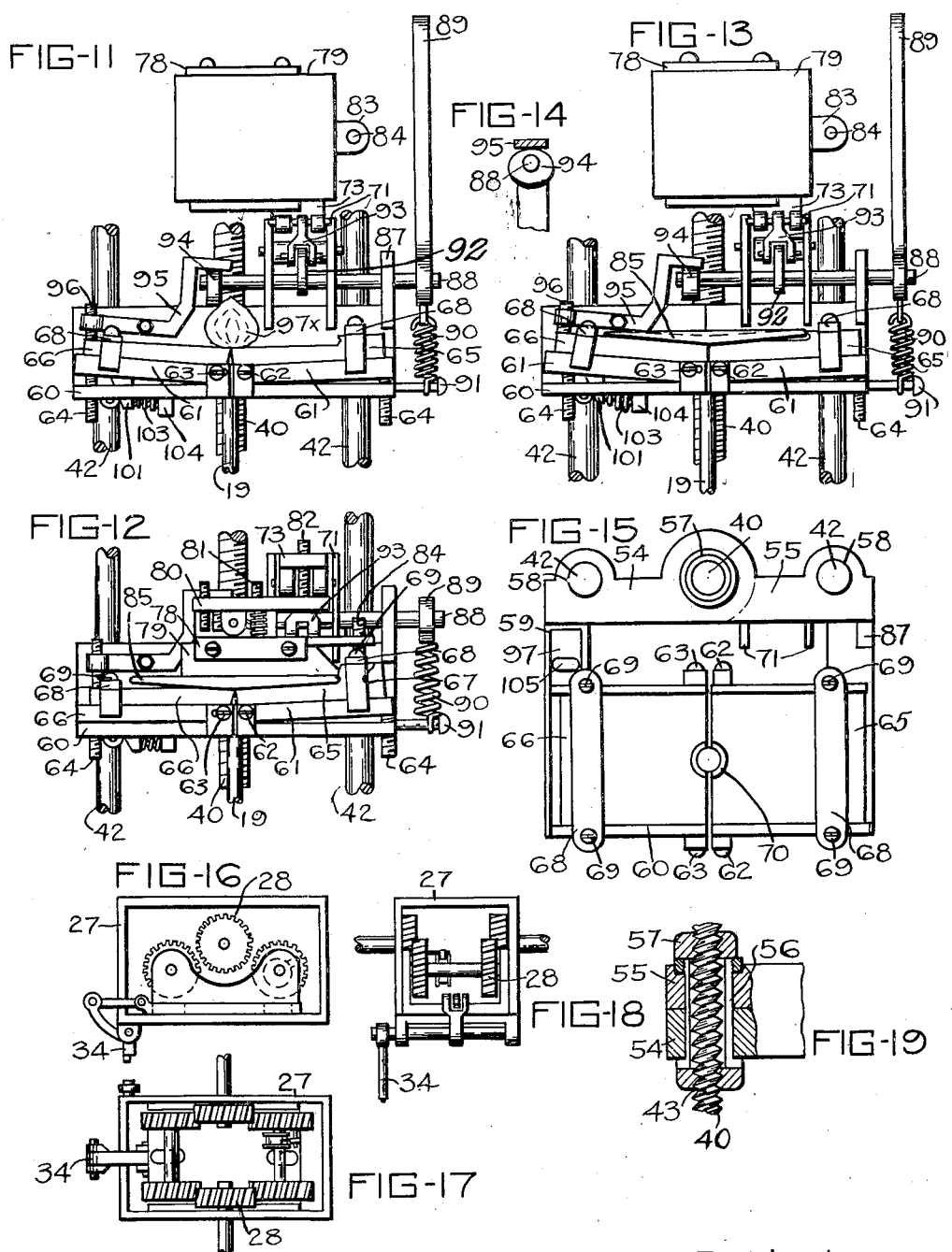
James W. R. Hiteshew
INVENTOR
BY *Victor J. Evans & Co.*
ATTORNEYS

UNITED STATES PATENT OFFICE 2,157,985

GLASSWARE FOOT MAKING MACHINE

James W. R. Hiteshew, Columbus, Ohio

Application November 13, 1936, Serial No. 110,750

8 Claims. (Cl. 49—35)

The invention relates to glassware foot making machines and more especially to a machine for casting feet on hand blown glass stemware, certain types of pressed stemware and machine blown stemware for the making of footed tumblers, or other glass articles having a cast foot.

The primary object of the invention is the provision of a machine of this character, wherein in the operation thereof a foot or base of glass will be molded or cast onto the stem of glassware, either a tumbler, goblet or other glass article requiring a foot or base, the foot being formed or molded to the stem in a novel manner and such ware will be seamless except in a fancy figured stem and the base or foot will be rendered smooth with a high polished surface, the said foot being cast or molded to the stem of the glassware subsequent to the blowing of the latter with its stem.

Another object of the invention is the provision of a machine of this character, wherein the foot for the glassware will be formed automatically in the working of the said machine and can be of any determined size and of the required thickness according to the design or style of glass article footed by the machine.

A further object of the invention is the provision of a machine of this character, wherein the same will make feet on glass articles of various designs, producing a seamless polished foot without the necessity of skilled labor and that may be of varying design impossible to make by hand labor.

A still further object of the invention is the provision of a machine of this character, wherein the same will press soft glass into the shape of a cast foot and form the same on the stem of glassware, being devoid of unsightly rings or ridges at the foot as the same will be polished and rendered seamless.

A still further object of the invention is the provision of a machine of this character, which is comparatively simple in construction, thoroughly reliable and efficient in its operation, automatically acting, readily and easily adjusted according to the extent of the stem of glassware for the casting or molding of a foot thereon, strong, durable, and comparatively inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 11 is a view similar to Figure 5 showing the foot casting or forming mold in an open position.

Figure 12 is a view similar to Figure 11 with the mold closed.

Figure 13 is a view similar to Figure 11 showing the foot for the glassware finished and the mold open.

Figure 14 is a fragmentary elevation partly in section of the cam for controlling or setting one mold section.

Figure 15 is a top plan view of companion bottom mold sections with the top mold section removed.

Figure 16 is an elevation of the transmission gearing of the machine.

Figure 17 is a top plan view thereof.

Figure 18 is an end elevation.

Figure 19 is a fragmentary vertical sectional view showing the mounting of the lower foot molding sections of the machine for adjustment thereof.

Similar reference characters indicate corresponding parts throughout the several views in the drawings.

Figure 1:
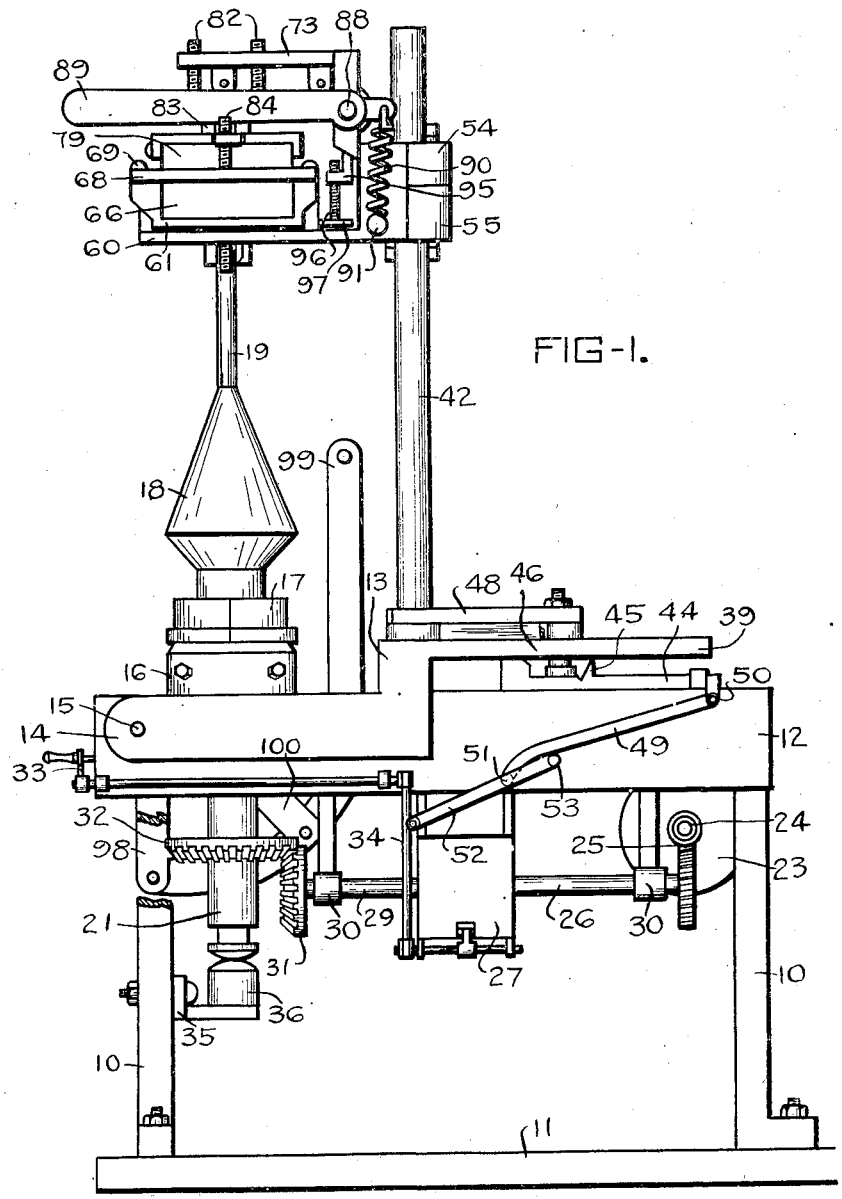
Figure 1 is a side elevation of a machine constructed in accordance with the invention, a portion being broken away.
Figure 2:
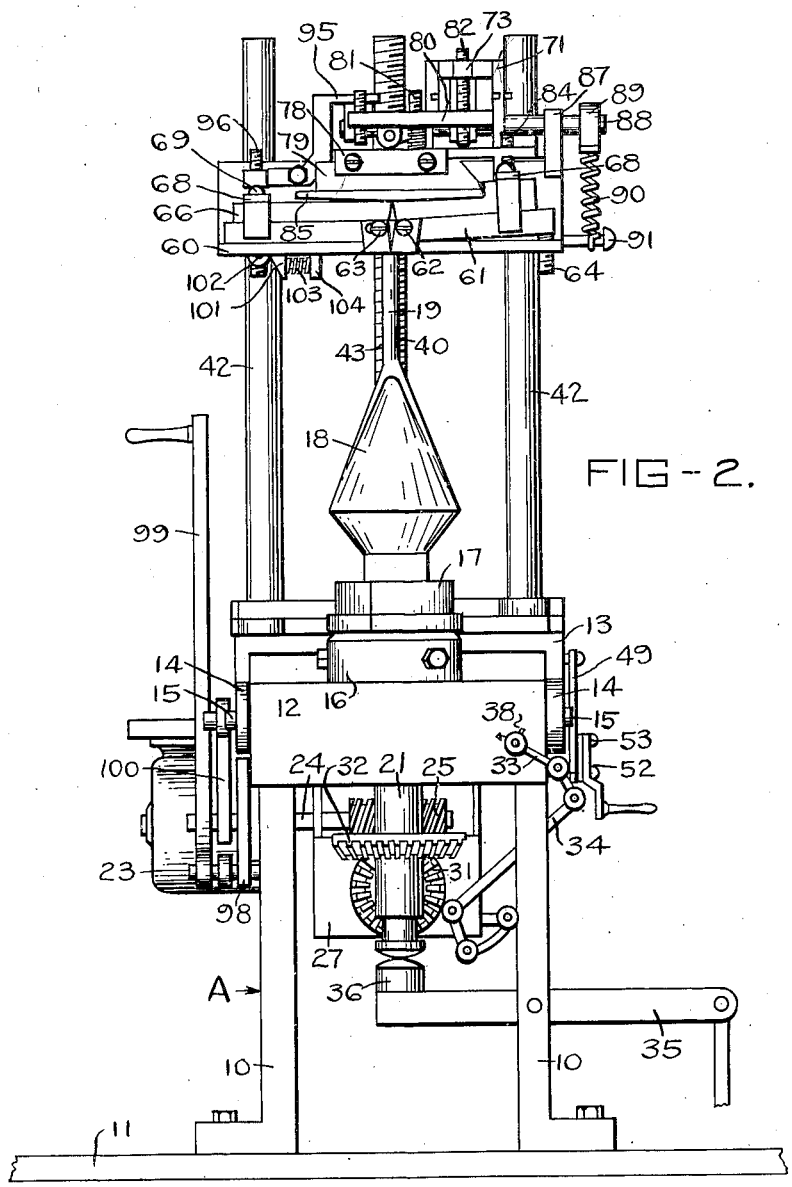
Figure 2 is a front elevation thereof.
Figure 3:
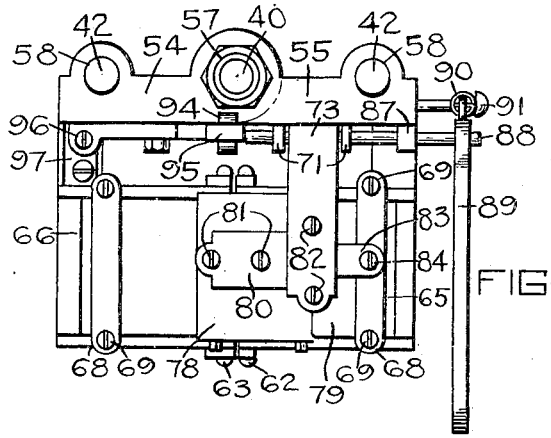
Figure 3 is a top plan view of the foot forming or casting mechanism.
Figure 4:
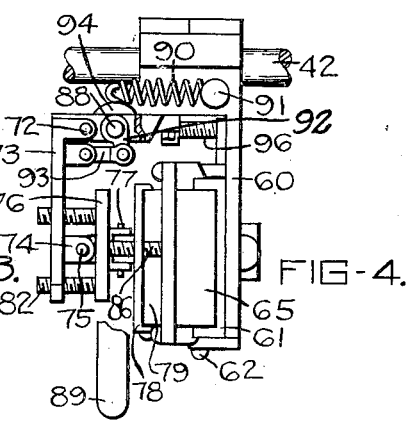
Figure 4 is a side elevation partly in section thereof.
Figure 5:
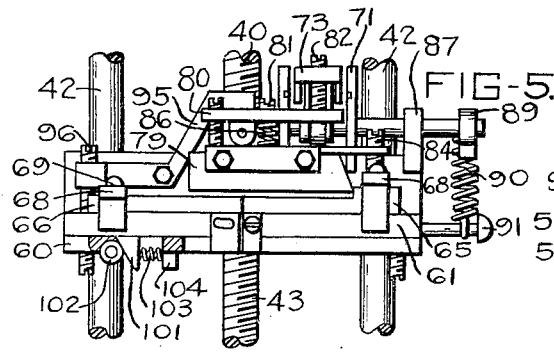
Figure 5 is a front elevation partly broken away.
Figure 6:
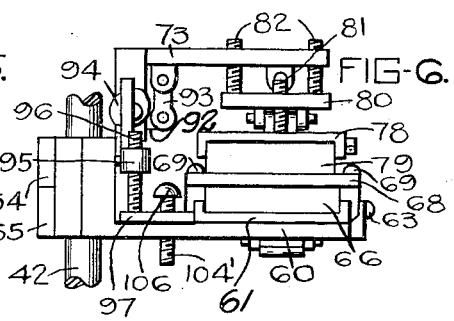
Figure 6 is an opposite side elevation thereof.
Figure 7:
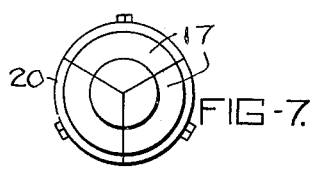
Figure 7 is a top plan view of the chuck for the holding of the blown glass article.
Figures 9, 10:
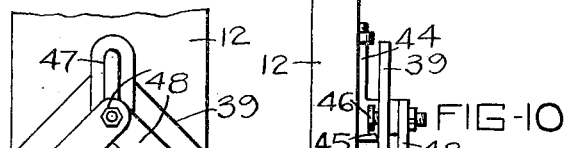
Figure 9 is a fragmentary top plan view of the chuck stand or table and its carrier.
Figure 10 is a side elevation thereof.
Figure 8:
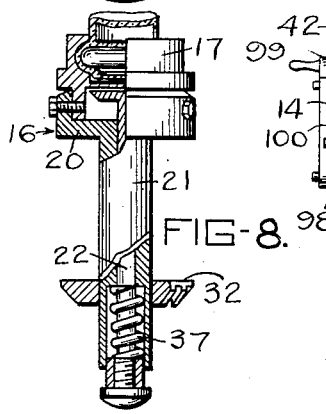
Figure 8 is a side elevation partly in section of said chuck and its adjuncts.

Referring to the drawings in detail, the machine comprises a stand A having the upright legs 10, these being secured to a foundation 11 in their vertical upright position and support a table or bed 12 disposed horizontally and at the front portion thereof is arranged a mold carriage 13 having opposite side arms 14 which are pivoted at 15 to the table or bed 12 for vertical swinging movement. This carriage 13 has rotatably associated therewith a chuck 16 formed with opening and closing jaws 17 adapted for embracing and securing in place a blown glassware article 18 having the stem 19. The jaws 17 are fitted in a circular head 20 at the upper end of a turning shank 21 for the said chuck 16 which is suitably rotatably supported in the bed 12 and within this shank 21 is a spring tensioned jaw opener and closer in the form of a plunger 22 for actuating the jaws 17 of the chuck 16 in the clamping and unclamping of the glassware 18 in a manner presently described.

Suitably supported in the stand A is an electric motor 23 which is immediately beneath the table or bed 12 and its power shaft 24 through gear connections 25 operates a drive shaft 26 extended within a transmission case 27 fixed within the stand A. Within this case is transmission mechanism 28 controlling a driven shaft 29 which also extends into the case 27, these shafts 26 and 29 being fitted in bearings or hangers 30 in the stand A. The driven shaft 29 carries a beveled pinion or gear 31 meshing with a companion gear 32 fixed to the shank 21 so that motion can be imparted to this shank for the turning of the chuck 16. The transmission mechanism 28 is of a type to effect rotation of the shank 21 or oscillation thereof and such mechanism is susceptible of a neutral position to render the shank 21 and its chuck 16 passive, the mechanism 28 being controlled through manually set handle 33 connected through linkage 34 therewith and this handle is located at the front of the stand A convenient to an attendant of the machine.

Pivotally supported in the stand A is a throw lever 35 having the contact end 36 operative upon the plunger 22 so that when this lever 35 is depressed the jaws 17 of the chuck 16 will be opened for the reception of the glassware 18 for the clamping of the same, the jaws being closed under the influence of a spring 37 active upon said plunger 22 within the shank 21 when pressure is removed from the lever 35 and such lever is manually operated.

The handle 33 cooperates with a dial 38 at the front of the sand A indicative of rotary, neutral and oscillatory set positions of the transmission mechanism 28.

The carriage 13 has a step 39 above which rises a vertically disposed hinging post 40 extending perpendicular and having loose thereon a pair of reversely extended links 41 which also are loosely engaged with vertical shift posts 42, the post 40 being fixed in the step 39 and such shift posts 42 are at opposite sides of the latter and uniformly spaced therefrom. These posts 40 and 42 are extended upwardly uniformly to a determined height from the step 39 of the carriage 13. The post 40 is provided with external screw threads 43 for a purpose presently described.

Fitted upon and suitably guided on the table or bed 12 beneath the step 39 of the carriage 13 is a slide 44 having a releasing socket or seat 45 for a coupling pin 46 movable in a guide slot 47 in the step 39 of the carriage 13 and pivotally connecting a pair of throw links 48 loosely attached with the posts 42 so that when the slide 44 is shifted the said posts 42 will also be shifted by the throw links 48. The slide 44 is shifted by a compound lever including the member 49 pivoted at 50 to the said slide 44 and at 51 to the other member 52 of said lever and this member 52 constitutes a hand crank pivoted at 53 to the table or bed 12, the member 49 when in one position when shifted by the member 52 will become latched to hold the slide 44 in adjusted position. This compound lever including the members 49 and 52 is located at one side of the stand A preferably at the right hand side thereof. The shifting of the slide 44 by the compound lever including the members 49 and 52 is for a two-fold purpose hereinafter fully described.

Operatively carried by the posts 40 and 42 at a determined elevation above the chuck 16 is the foot or base molding or forming mechanism for the stem glassware 18 and comprises a pair of horizontally arranged opening and closing arms 54 and 55, respectively, hinged on a sleeve 56 loose upon the post 40 while carried by this post are nuts 57, these being adjustable through the threads 43 on said post and lock the sleeve 56 in an adjusted position upon the latter to locate the arms 54 and 55 at the determined height above the chuck 16. The arms 54 and 55 are formed with eyes 58 loosely receiving the shift posts 42. These arms 54 and 55 through extensions 59 are formed with mold supports 60 disposed in a horizontal plane and match each other when brought toward one another. On these supports 60 are mold racks 61, one being fixedly pivoted at 62 and the other displaceably pivoted at 63, respectively. These racks 61 in their pivotal mounting, which is at the inner ends thereof, are susceptible of being variably inclined reversely to each other and the set inclined position of such racks will be had by set screws 64 threaded in the supports 60 close to the outer ends thereof. The racks 61 have thereon carbon mold units 65 and 66, respectively, the unit 65 being formed with an edging ledge or shoulder 67 and such units are made fast to the racks 61 by releasable clamping straps 68 fastened at 69 in place on the racks 61 and in this manner the units 65 and 66 are removable from the racks.

The racks 61 and the units 65 and 66 at the approaching edges thereof are provided with half circular recesses 70 for the accommodation of the stem 19 of the glassware 18 on the bringing together of the supports 60 and the snug fitting of the units 65 and 66 about said stem for a purpose presently described.

Formed on the arm 55 are bearings 71 in and between which is pivoted at 72 a vertically swinging hanger 73 provided at its lower face with a pivot ear 74 fitted with a pivot 75 for swingingly connecting a rocker head 76 therewith. This rocker head 76 through a pivotal connection 77 carries a mold rack 78 in which is removably fitted an upper carbon mold unit 79. The head 76 has the lateral extension 80 for the rack 78 so as to properly position the unit 79 for coworking with the units 65 and 66 when these units are in closing relation to each other for the molding or formation of a base or foot of glass to the ware 18 at the stem 19 thereof in the operation of the machine.

The hanger 73 carries a pair of spaced set screws 82 which play against the head 76 for setting the same level or at an incline in either a forward or rearward direction. The head 76 carries a pair of spaced set screws 81, these acting against the rack 78 to regulate the swing thereof on the pivotal connection 77 while this rack has formed therewith a lateral ear 83 in which is a set screw 84 adapted for contact with a clamping strap 68 to dispose the unit 79 at an inclination when closing the mold units for the molding or casting of the foot or base 85 of glass upon the stem 19 of the ware 18 in the operation of the machine. Interposed between the head 76 and the rack 78 at one side of the pivotal connection 77 therebetween is a coiled spring 86 which functions for urging the rack in a direction for the contact of the set screw 84 with the strap 68 next thereto when the mold units are closed. The rack 78 is in a limited degree self-adjusting on the closing of the unit 79.

Formed on the arm 55 is a bearing 87 in which is journaled a rocking shaft 88 to which is fixed a hand lever 89 having connected thereto a coiled retractile spring 90 fixed to a holding pin 91 in the support 60 next thereto and this spring effects the automatic opening of the unit 79, the shaft 88 being fitted with a crank 92 to which is pivoted a link 93, the same being also pivoted to the hanger 73 and in this manner on the rocking of the shaft 88 motion will be imparted to the unit 79 for vertical swinging movement to opened or closed position.

The shaft 88 carries a cam or eccentric 94 active upon a pivotally supported presser lever 95 carrying an adjustable set screw 96 which is adapted for engagement with a contact 97 on the rack 61 next thereto so as to dispose such rack at a determined inclination and to shift it toward the other rack 61 carrying the unit 65 when the mold units are closed with respect to each other and in this fashion having the units 65 and 66 snugly embrace the stem 19 of the ware 18 and assuring the proper bevel to the base or foot 85 in the forming thereof of glass.

The spring 90 when down pressure is relieved from the lever 89 will automatically open the unit 79 while the arms 54 and 55 will be caused to swing to open position of the units 65 and 66 laterally through the action of the shifting of the posts 42, the said slide 44 in movement thereof being for this purpose. The slide 44 also shifts the posts 42 to close the arms 54 and 55 for the bringing together of the units 65 and 66 in molding position with respect to each other for the molding of the glass foot or base 85. It is understood, of course, that a determined quantity of molten glass as at 97x is placed upon the units 65 and 66 when closed at the point of location of the stem 19 of the ware 18 to enable the formation of the base or foot 85, it being understood, of course, that the unit 79 will be in open position when this quantity of molten glass 97x is placed upon the units 65 and 66 as is clearly shown in Figure 11 of the drawings.

Pivoted to a bracket 98 on the stand A is a hand lever 99 which through the link 100 pivoted thereto and to the carriage 13 enables through hand manipulation of the lever 99 the vertical swinging of the said carriage 13 and when this carriage is swung upwardly and outwardly it enables the mold units 65, 66 and 79 to be dipped in a cooling liquid such as water for the rendering of such units cold, it being understood, of course, that this is effected after the foot or base 85 has been molded or formed on the stem 19 of the ware 18 and the latter removed from the machine. Normally the carriage 13 is lowered onto the table or bed 12 to assume a horizontal position and when such carriage has been raised for the tilting thereof the slide 44 will have been shifted to permit the release of the pin 46 from the latching seat 45 in said slide 44, the pin 46 being latched to the slide 44 when the mold units 65 and 66 are shifted toward each other in the lateral closing of the same. The closing of the units 65 and 66 is independent of the closing of the unit 79 which is accomplished by manually operating the lever 89.

To shift the rack 61 carrying the unit 66 toward the unit 65 as carried by the other rack 61 there is provided on the rack 61 for the unit 66 a beveled runner 101 which engages with a roller 102 on the support 60 upon the arm 54 and this runner 101 is urged into contact with the roller 102 by a coiled expansion spring 103 seated at 104 against an abutment on said support 60. When the rack 61 carrying the unit 66 is depressed by the lever 95 through its set screw 96 the runner 101 travels on the roller 102 forcing the said rack 61 with the unit 66 therein in the direction of the unit 65 on the other rack 61 against the resistance of the spring 103. This set screw 96 according to its adjustment gives the proper lay to the rack 61 having the unit 66 therein with relation to the set inclined position of the unit 65 on the closing of the unit 79 for forming the foot or base 85 when the ware 18 is rotated by the chuck 16 which is driven from the motor 23. The quantity of molten glass 97x initially will be flattened by the closing of the unit 79 and a wiping action thereon is had thereby under the rotation of the ware 18 when the chuck is turned through the motor 23. The ledge or shoulder 67 of the unit 65 functions to mold and shape the peripheral edge of the base or foot 85 during the molding thereof in the operation of the machine.

An ironing or wiping action is set up by the mold units 65, 66 and 79 in the formation of the base or foot 85 when the ware 18 is rotated when clamped in the chuck 16 and such base or foot will be molded or cast with a smooth polished surface devoid of ridges or rings in the formation thereof.

The ware 18 with its stem 19 when within the machine may be rotated or oscillated in a rotary direction under movement imparted to the chuck 16, the transmission mechanism 28 being regulated for such purpose and this transmission mechanism is regulated by the control handle 33 at the front of the machine or the stand A thereof.

The support 60 on that side having the rack 61 supporting the unit 66 has adjustably threaded therein a headed set screw 104' which plays through an elongated slot 105 in the contact 97 and the head 106 of this screw 104' regulates the incline of the unit 66 on the rebound of the rack 61 having the latter unit under the action of the spring 103 when the top mold section or unit 79 is raised as the said contact 97 will engage with the head 106 of the screw 104' and thus the cupping of the base or foot 85 will be had through the unit 66 and such cupping operation is arrived at through the raising of the unit 79.

The inclined disposition of the units 65 and 66 of the molding mechanism gives the proper bevel to the upper side of the base or foot 85 in the casting or molding thereof while the unit 79 operates to shape the bottom face of said base or foot, either to cup the same or for having such surface flat or level.

It is, of course, understood that in the operation of the machine and before operation the chuck 16 is open by manipulating the lever 35 to enable the clamping of the ware 18 in this chuck. The control handle 33 will have been shifted to bring the transmission mechanism 28 to a neutral condition. Also the mold units for the base or foot 85 will be in open position to allow the stem 19 of the ware 18 to be embraced at the uppermost or free end of such stem by the units 65 and 66 when the same are closed with respect to each other. The closing of these units is had by operating the slide 4. After the closing of the units 65 and 66 the quantity of soft or molten glass 97x is dropped onto such units and thereafter the unit 79 is closed whence the transmission mechanism is adjusted for imparting motion to the ware 18 and under such motion the quantity of molten or soft glass 97x will be acted upon by the mold units 65, 66 and 79 for the casting or molding of the foot 85 and the joining thereof with the stem 19 of the ware 18. It is, of course, understood that these units 65, 66 and 79 will have previously been adjusted to give the proper set thereto when the same are closed with relation to each other for the beveling of the foot and the shaping of the same when being cast or molded.

Upon the molding or casting of the foot or base 85 the chuck 16 is open and the mold units 65 and 66 are open, the mold unit 79 being opened by the action of the spring 90 and in this fashion the ware 18 can be removed from the machine with the foot or base molded to its stem 19.

While it has been indicated that the machine in the opening and closing of the chuck and the mold units will be had by hand such operations may be mechanically carried forth and this is contemplated within the scope of the invention as fall within the appended claims.

The glassware 18 is blown with the bowl and stem prior to the introduction thereof into the machine for the molding or casting of the foot or base upon the stem of such ware.

What is claimed is:

1. A machine of the character described comprising a stand, a mold carriage pivotally arranged on the stand for vertical swinging movement, a jawed chuck on the stand for holding glassware having a stem, means for rotating the chuck, foot forming carbon molds movable to operative position about said stem and adapted to form and join a foot to said stem, means for moving the foot forming molds to operative and inoperative positions about and from said stem, means constituting a support on the carriage for the said molds, and means associated with the support for adjusting said carbon molds independently of the second-named means.

2. A machine of the character described comprising a stand, a mold carriage pivotally arranged on the stand for vertical swinging movement, a jawed chuck on the stand for holding glassware having a stem, means for rotating the chuck, foot forming carbon molds movable to operative position about said stem and adapted to form and join a foot to said stem, means for moving the foot forming molds to operative and inoperative positions about and from said stem, means constituting a support on the carriage for the said molds, means associated with the support for adjusting said carbon molds independently of the second-named means, and means for swinging the carriage from a horizontal to a substantially vertical position.

3. A machine of the character described comprising a stand, a mold carriage pivotally arranged on the stand for vertical swinging movement, a jawed chuck on the stand for holding glassware having a stem, means for rotating the chuck, foot forming carbon molds movable to operative position about said stem and adapted to form and join a foot to said stem, means for moving the foot forming molds to operative and inoperative positions about and from said stem, means constituting a support on the carriage for the said molds, means associated with the support for adjusting said carbon molds independently of the second-named means, means for swinging the carriage from a horizontal to a substantially vertical position, and mechanism for regulating the rotation of said chuck.

4. A machine of the character described comprising a stand, a mold carriage pivotally arranged on the stand for vertical swinging movement, a jawed chuck on the stand for holding glassware having a stem, means for rotating the chuck, foot forming carbon molds movable to operative position about said stem and adapted to form and join a foot to said stem, means for moving the foot forming molds to operative and inoperative positions about and from said stem, means constituting a support on the carriage for the said molds, means associated with the support for adjusting said carbon molds independently of the second-named means, means for swinging the carriage from a horizontal to a substantially vertical position, mechanism for regulating the rotation of said chuck, and manually operated means for opening and closing the jaws of the chuck.

5. A machine of the character described comprising a stand, a mold carriage pivotally arranged on the stand for vertical swinging movement, a jawed chuck on the stand for holding glassware having a stem, means for rotating the chuck, foot forming carbon molds movable to operative position about said stem and adapted to form and join a foot to said stem, means for moving the foot forming molds to operative and inoperative positions about and from said stem, means constituting a support on the carriage for the said molds, means associated with the support for adjusting said carbon molds independently of the second-named means, means for swinging the carriage from a horizontal to a substantially vertical position, mechanism for regulating the rotation of said chuck, manually operated means for opening and closing the jaws of the chuck, and means fastening the carriage when in one position.

6. A machine of the character described comprising a stand, a mold carriage pivotally arranged on the stand for vertical swinging movement, a jawed chuck on the stand for holding glassware having a stem, means for rotating the chuck, foot forming carbon molds movable to operative position about said stem and adapted to form and join a foot to said stem, means for moving the foot forming molds to operative and inoperative positions about and from said stem, means constituting a support on the carriage for the said molds, means associated with the support for adjusting said carbon molds independently of the second-named means, means for swinging the carriage from a horizontal to a substantially vertical position, mechanism for regulating the rotation of said chuck, manually operated means for opening and closing the jaws of the chuck, means fastening the carriage when in one position, and means for detachably fastening the molds in place.

7. A machine of the character described comprising a stand, a mold carriage pivotally arranged on the stand for vertical swinging movement, a jawed chuck on the stand for holding glassware having a stem, means for rotating the chuck, foot forming carbon molds movable to operative position about said stem and adapted to form and join a foot to said stem, means for moving the foot forming molds to operative and inoperative positions about and from said stem, means constituting a support on the carriage for the said molds, means associated with the support for adjusting said carbon molds independently of the second-named means, means for swinging the carriage from a horizontal to a substantially vertical position, mechanism for regulating the rotation of said chuck, manually operated means for opening and closing the jaws of the chuck, means fastening the carriage when in one position, means for detachably fastening the molds in place, and means for effecting limited self-adjustment of one of the molds.

8. A machine of the character described comprising a stand, a mold carriage pivotally arranged on the stand for vertical swinging movement, a jawed chuck on the stand for holding glassware having a stem, means for rotating the chuck, foot forming carbon molds movable to operative position about said stem and adapted to form and join a foot to said stem, means for moving the foot forming molds to operative and inoperative positions about and from said stem, means constituting a support on the carriage for the said molds, means associated with the support for adjusting said carbon molds independently of the second-named means, means for swinging the carriage from a horizontal to a substantially vertical position, mechanism for regulating the rotation of said chuck, manually operated means for opening and closing the jaws of the chuck, means fastening the carriage when in one position, means for detachably fastening the molds in place, means for effecting limited self-adjustment of one of the molds, and means for varying the position of the molds with respect to the chuck.

JAMES W. R. HITESHEW.